US012381042B2

United States Patent
Kubo et al.

(10) Patent No.: US 12,381,042 B2
(45) Date of Patent: Aug. 5, 2025

(54) ELECTRODE FOIL FOR ELECTROLYTIC CAPACITOR AND ELECTROLYTIC CAPACITOR

(71) Applicant: Japan Capacitor Industrial Co., Ltd., Tokyo (JP)

(72) Inventors: Hiroshi Kubo, Tokyo (JP); Masaya Otsuka, Tokyo (JP)

(73) Assignee: Japan Capacitor Industrial Co., Ltd., Tokyo (JP)

(*) Notice: Subject to any disclaimer, the term of this patent is extended or adjusted under 35 U.S.C. 154(b) by 248 days.

(21) Appl. No.: 18/137,696

(22) Filed: Apr. 21, 2023

(65) Prior Publication Data
US 2023/0260699 A1     Aug. 17, 2023

Related U.S. Application Data

(63) Continuation of application No. PCT/JP2021/012547, filed on Mar. 25, 2021.

(30) Foreign Application Priority Data

Dec. 22, 2020 (JP) ................................. 2020-212803
Mar. 4, 2021 (JP) ................................. 2021-034329

(51) Int. Cl.
*H01G 9/04*        (2006.01)
*H01G 9/048*      (2006.01)
(Continued)

(52) U.S. Cl.
CPC .............. *H01G 9/04* (2013.01); *H01G 9/048* (2013.01); *H01G 9/055* (2013.01); *H01G 9/151* (2013.01)

(58) Field of Classification Search
CPC .......... H01G 9/04; H01G 9/048; H01G 9/055; H01G 9/151; H01G 9/15
See application file for complete search history.

(56) References Cited

U.S. PATENT DOCUMENTS

2018/0315552 A1    11/2018   Narita et al.
2019/0371531 A1*   12/2019   Fukushima ............ H01G 9/008
(Continued)

FOREIGN PATENT DOCUMENTS

| JP | 2004207253 A | 7/2004 |
| JP | 2013153024 A | 8/2013 |

(Continued)

OTHER PUBLICATIONS

Notice of Reasons for Refusal, JP Application No. 2021-034329, Jun. 8, 2021.
(Continued)

*Primary Examiner* — Timothy J. Dole
*Assistant Examiner* — Kaemon Eli Watada
(74) *Attorney, Agent, or Firm* — The Webb Law Firm

(57) ABSTRACT

An electrode foil having high capacitance per unit volume is provided. The electrode foil is an electrode foil for an electrolytic capacitor. The electrode foil is an electrode foil extending in a longitudinal direction and having a width direction orthogonal to the longitudinal direction, the electrode foil including an enlarged surface portion on a surface of the electrode foil, wherein a crack is formed in the enlarged surface portion in a direction oblique to the width direction.

10 Claims, 14 Drawing Sheets

(51) Int. Cl.
    *H01G 9/055*     (2006.01)
    *H01G 9/15*     (2006.01)

(56) References Cited

U.S. PATENT DOCUMENTS

2020/0388443 A1    12/2020  Narita et al.
2022/0059287 A1    2/2022  Li et al.

FOREIGN PATENT DOCUMENTS

| | | |
|---|---|---|
| JP | 2018120939 A | 8/2018 |
| JP | 2018120952 A | 8/2018 |
| JP | 2018152483 A | 9/2018 |
| JP | 2019067939 A | 4/2019 |
| JP | 2019067940 A | 4/2019 |
| TW | 202004797 A | 1/2020 |
| WO | 2017171028 A1 | 10/2017 |
| WO | 2018181485 A1 | 10/2018 |
| WO | 2020177626 A1 | 9/2020 |
| WO | WO-2020241174 A1 * 12/2020 ............. C25D 11/12 |

OTHER PUBLICATIONS

Notice of Reasons for Refusal, JP Application No. 2021-034329, Sep. 28, 2021.
Notice of Reasons for Refusal, JP Application No. 2022-000612, Mar. 8, 2022.
Notice of Reasons for Refusal, JP Application No. 2022-000612, Jun. 10, 2022.
Notice of Initial Examination Opinion, TW 110110885, Jul. 4, 2022.
EP 21909744, Extended European Search Report, Apr. 3, 2025.

* cited by examiner

— REFERENCE LINE (P)
----- CONTINUOUS CRACK (Q)
☐ 100 μm × 500 μm RANGE (R)
— CRACK ANGLE MASUREMENT LINE (S)
◢ CRACK ANGLE (T)

ELECTRODE FOIL FOR ELECTROLYTIC CAPACITOR AND ELECTROLYTIC CAPACITOR

CROSS-REFERENCE TO RELATED APPLICATIONS

This application is a bypass continuation of International Patent Application No. PCT/JP2021/012547 filed Mar. 25, 2021, and claims priority to Japanese Patent Application No. 2020-212803 filed Dec. 22, 2020 and Japanese Patent Application No. 2021-034329 filed Mar. 4, 2021, the disclosures of which are hereby incorporated by reference herein in their entireties.

BACKGROUND OF THE INVENTION

Field of the Invention

The present invention relates to an electrode foil for an electrolytic capacitor and an electrolytic capacitor.

Description of Related Art

In order to increase the capacitance of a capacitor by using a capacitor case of the same size as that of a conventional one, it is necessary to increase capacitance per unit volume. From the viewpoint of the electrode foil, it is necessary to make capacitance per projected area the same as that of the conventional one and reduce a foil thickness, or to make the foil thickness the same as that of the conventional one and increase the capacitance per projected area. However, just reducing the foil thickness means nothing more than just reducing the thickness of a core portion which is a portion of the electrode foil where an enlarged surface portion (surface-roughened or surface-enlarged portion) is not formed, and a decrease in strength is inevitable. Further, in a case where the surface of the electrode foil is formed as an enlarged surface portion of a spongy structure, there arises a problem in terms of strength that the electrode foil becomes hard and brittle so that workability at the time of producing the capacitors deteriorates when fine pits are formed at a high density in order to increase the capacitance per projected area.

Then, in order to solve the problem in terms of strength, it is generally performed to make the capacitance per projected area the same as that of the conventional one to increase the foil thickness. Alternatively, International Laid-Open No. WO 2017/171028 discloses that a dividing portion in a width direction is extended in the enlarged surface portion of the surface of the electrode foil (claim 1, paragraph 0033, and FIG. 5 of Patent Literature 1). Furthermore, from the viewpoint of the impregnation property of an electrolytic solution rather than from the viewpoint of the electrode foil itself, Japanese Patent Laid-Open No. 2013-153024 discloses that a groove is also formed by laser machining at an angle with respect to a longitudinal direction on the roughened surface of the electrode foil (claim 1, paragraphs 0050 and 0052, and FIGS. 9 and 11 of Patent Literature 2).

CITATION LIST

Patent Literature

PTL 1: International Laid-Open No. WO 2017/171028
PTL 2: Japanese Patent Laid-Open No. 2013-153024

However, in the generally used method of making the capacitance per projected area the same as that of the conventional one and increasing the foil thickness, since the foil thickness is increased, the capacitance per unit volume becomes lower than that of the conventional one.

In the method disclosed in International Laid Open No. WO 2017/171028, when the dividing portion is formed on the enlarged surface portion of the surface of the electrode foil, stress is dispersed and tensile elongation at break is improved. In this case, when an anode foil and a cathode foil are wound via a separator, it is possible to suppress the occurrence of bending in some places to allow smooth winding.

However, a maximum tensile load decreases due to the formation of the dividing portion (Problem 1). In addition, the maximum tensile load is reduced also by increasing the thickness of the enlarged surface portion in order to make the foil thickness the same as that of the conventional one and make the capacitance per projected area higher than that of the conventional one (Problem 2). Therefore, when the dividing portion is formed after the enlarged surface portion having an increased thickness is formed, the maximum tensile load is further reduced. In particular, when tension is applied to perform slitting at high speed in a capacitor maker, there is a danger that the electrode foil will break. In this case, since it is difficult to make the capacitance per projected area higher than that of the conventional one, it is also difficult to make the capacitance per unit volume higher than that of the conventional one.

In the method disclosed in Japanese Patent Laid-Open No. 2013-153024, a groove is formed on the surface of an electrode foil by laser machining. In this case, when being immersed in an electrolytic solution, the electrolytic solution is easily impregnated into the entire separator through the groove, and the electrolytic solution can be retained between an anode foil and a cathode foil enough to improve an impregnation property.

However, regardless of a direction in which the groove is formed, part of the surface roughened by laser machining is scraped off from the electrode foil. Therefore, a decrease in capacitance per projected area is unavoidable, and as a result, a decrease in capacitance per unit volume is also unavoidable.

Because needs for miniaturization of electronic components such as capacitors further increase, an enlarged surface portion structure of an electrode foil has been miniaturized and made uniform in order to increase the capacitance per unit volume. Accordingly, the enlarged surface portion itself becomes hard and brittle. As a result, it is necessary to leave a residual core thickness that does not contribute to the capacitance thicker than that of an existing electrode foil. That is, even if the capacitance per unit volume of only the enlarged surface portion is increased, it is difficult to obtain an improvement effect when viewed as a whole foil.

SUMMARY OF THE INVENTION

The present invention is made in view of the above problems, and one object of the present invention is to provide an electrode foil having high capacitance per unit volume while ensuring mechanical strength. Another object of the present invention is to provide an electrolytic capacitor using the electrode foil.

One example of means for solving the problems to be solved by the present invention is an electrode foil for an electrolytic capacitor, the electrode foil extending in a longitudinal direction and having a width direction orthogonal to the longitudinal direction, the electrode foil comprising an enlarged surface portion on a surface of the electrode foil, wherein a crack is formed in the enlarged surface portion in an oblique direction with respect to the width direction.

In one embodiment, the oblique direction may have an angle of 12° or more and 80° or less with respect to the width direction.

In another embodiment, the oblique direction may have an angle of 25° or more and 80° or less with respect to the width direction.

In another embodiment, the oblique direction may have an angle of 12° or more and 55° or less with respect to the width direction.

In another embodiment, the oblique direction may have an angle of 25° or more and 55° or less with respect to the width direction.

In another embodiment, the crack may comprise a plurality of cracks that intersect with each other.

In another embodiment, the crack may be formed in a V shape.

In another embodiment, a dielectric film may be further formed in the enlarged surface portion including a region of the crack.

Another example of means for solving the problems to be solved by the present invention is an electrolytic capacitor in which the electrode foil is used as a cathode foil or an anode foil.

Further features of the present invention will become apparent from the following description of exemplary embodiments with reference to the attached drawings.

DESCRIPTION OF THE INVENTION

An electrode foil for an electrolytic capacitor and an electrolytic capacitor of the present invention will be described below with reference to the drawings. Although the drawings are used to describe the present invention, the present invention is not limited to the contents of the drawings.

<Electrode Foil>

Figure 1:
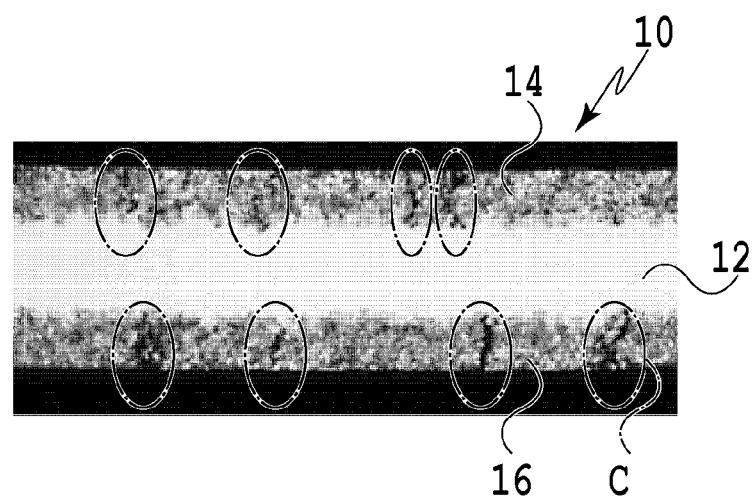
FIG. 1 is a cross-sectional photograph showing a core portion, an enlarged surface portion, and a crack of an electrode foil of the present invention.
Figure 2:
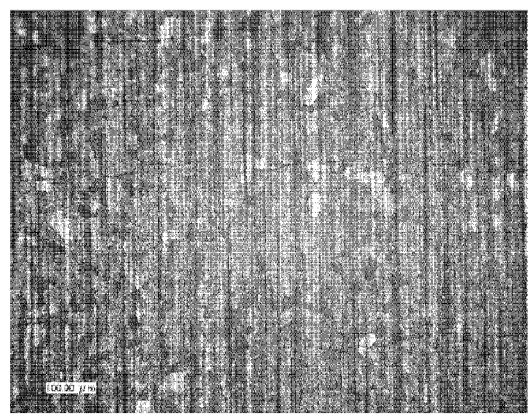
FIG. 2 is a surface photograph of a conventional electrode foil in which no crack is formed in an enlarged surface portion.

FIG. 1 is a cross-sectional photograph of an electrode foil 10 according to an embodiment of the present invention. The electrode foil 10 includes an enlarged surface portion 14 on the front surface of the electrode foil. In the embodiment shown in FIG. 1, a further enlarged surface portion 16 is formed on the back surface of the electrode foil 10.

The electrode foil 10 is an electrode foil extending in a longitudinal direction and has a width direction orthogonal to the longitudinal direction. The electrode foil extending in a longitudinal direction is typically an elongated electrode foil, and more typically a rectangular electrode foil. In the case of the elongated electrode foil, the longitudinal direction can be the direction of a side extending in an elongated manner. Alternatively, in the case of the rectangular electrode foil, the longitudinal direction can be a direction of a long side or a direction orthogonal to the direction of a short side of the rectangle. The width direction is a direction orthogonal to the longitudinal direction. Alternatively, as shown in embodiments described later, in a case where longitudinal streaks are formed on the electrode foil, the longitudinal direction may be the direction of the longitudinal streaks formed on the electrode foil. That is, the width direction orthogonal to the longitudinal direction may be a direction orthogonal to the direction of the longitudinal streaks formed on the electrode foil. The electrode foil can be a rectangular, oblong, trapezoidal, or any other shape that can set the longitudinal direction. The electrode foil of the present invention includes a square shape, and the longitudinal direction in this case can be either a direction parallel to two opposed sides of the electrode foil or a direction orthogonal to this direction.

The electrode foil 10 is suitably used as a cathode foil and an anode foil of a capacitor. The electrode foil 10 can also be used as a cathode foil (hereinafter referred to as a cathode unconverted foil) on which a dielectric film (also referred to as a chemical conversion film) is not formed. The electrode foil 10 can also be used as a cathode foil (hereinafter, referred to as a cathode converted foil) on which a dielectric film is formed. The electrode foil 10 can also be used as an anode foil (hereinafter referred to as an anode converted foil)

on which a dielectric film is formed. An anode foil before the dielectric film is formed thereon (hereinafter referred to as an anode unconverted foil) is also included in the electrode foil of the present invention. The electrode foil 10 can be formed from a valve metal material such as aluminum, niobium, or tantalum. Specifically, the electrode foil 10 is preferably formed of aluminum.

<Core Portion>

A core portion 12 is a portion of the electrode foil 10 in which the enlarged surface portion 14 is not formed. In other words, the core portion 12 corresponds to a solid layered portion of the electrode foil 10 with no crack in a depth direction. FIG. 1 which is the cross-sectional photograph of the electrode foil shows that the boundary between the core portion 12 and the enlarged surface portion 14 is not a perfect straight line but uneven. Therefore, when viewed three-dimensionally, the core portion 12 and the enlarged surface portion 14 form a complex structure with each other at the boundary between the core portion 12 and the enlarged surface portion 14.

Although the thickness of the core portion 12 is not particularly limited, it is 10 μm or more and 50 μm or less, for example. The thickness of the core portion 12 can be arbitrarily designed depending on required capacitance and strength.

<Enlarged Surface Portion>

The enlarged surface portion 14 is a layered portion formed on the front surface of the electrode foil 10. The enlarged surface portion 14 is usually formed by electrochemically or chemically etching in an electrolytic solution containing a chloride ion, using an aluminum foil pure enough to be used for an aluminum electrolytic capacitor as a base material. After etching, post-treatment such as acid cleaning may be performed in order to remove an adhering chloride ion and the like. The enlarged surface portion 14 may have a spongy shape, a tunnel shape, or a structure in which the tunnel shape and the sponge shape are combined.

In a case where the electrode foil 10 is used as the cathode converted foil or the anode foil, the dielectric film is formed on the enlarged surface portion 14 including a region of a crack C. Here, the dielectric film is formed by a chemical conversion treatment (anodic oxidation treatment) in which the electrode foil 10 is immersed in an ammonium adipate aqueous solution, ammonium dihydrogen phosphate aqueous solution, or boric acid aqueous solution and so forth to apply a predetermined voltage.

Although the thickness of the enlarged surface portion 14 is not particularly limited, it is 5 μm or more and 150 μm or less, for example. The thickness of the enlarged surface portion 14 can be arbitrarily designed depending on required capacitance and strength.

The enlarged surface portion 14 and the core portion 12 can be formed of the same material or can be formed of different materials. When the enlarged surface portion 14 and the core portion 12 are formed of the same material, voids in the enlarged surface portion can be formed continuously to an opening on the surface of the electrode foil, so that it is possible to avoid a state where the voids in the enlarged surface portion are closed by themselves in a case where they are formed of different materials. As a result, even after the capacitor is formed, a surface on which the dielectric film is not formed does not remain in the electrode foil. In addition, it is possible to avoid an increase in LC (leakage current) and a short-circuit failure when such surface is exposed in using the capacitor. When the enlarged surface portion 14 and the core portion 12 are formed of the same material, since materials remaining in the enlarged surface portion were originally integrated, they connect with the residual core without any interface at least before the dielectric film is formed. Therefore, when they are formed of different materials, it is possible to avoid forming a layer of oxide existing at the interface between the residual core and the enlarged surface portion and at the interface between the materials in the enlarged surface portion (for example, the interface between vapor-deposited particles in the case of a vapor deposition method) to decrease in the strength of the enlarged surface portion (collapse of the enlarged surface portion) due to an increase in the resistance component of the capacitor and a low adhesion.

<Further Enlarged Surface Portion>

In the embodiment shown in FIG. 1, a further enlarged surface portion 16 is formed on the back surface of the electrode foil 10. The further enlarged surface portion 16 can be configured in the same manner as the enlarged portion 14. Further, the range of the thickness of the further enlarged surface portion 16 is the same as that of the enlarged surface portion 14, and it is preferable that the enlarged surface portion 14 and the further enlarged surface portion 16 have substantially the same thickness. In the embodiment shown in FIG. 1, the crack C is also formed in the further enlarged surface portion 16. Therefore, in a wound type capacitor, for example, regardless of which surface is an outer circumference at the time of winding, it is possible to reduce cracks to be newly generated more effectively, and further reduce LC of the capacitor than in a case where a crack is formed only in the enlarged surface portion 14. This is because it is thought that, in a case where the surface on which the crack is formed faces an inner peripheral side when the capacitor is wound, new cracks are much more formed in an electrode foil in which a crack is formed only on one surface, than in an electrode foil in which a crack is formed on both surfaces. Specifically, in an anode converted foil, the larger the area of a portion where the dielectric film is not formed at the time of being worked into the form of a capacitor, the larger the LC of the capacitor tends to be. From the viewpoint of a reduction in LC, it is most preferable to form the enlarged surface portion on both surfaces of the electrode foil and to form a crack in each enlarged surface portion, and it is preferable to form the enlarged surface portion on both surfaces of the electrode foil and to form a crack only in one of the enlarged surface portions. Further, the present invention includes no crack being formed on the further enlarged portion 16.

<Crack>

Figure 3:
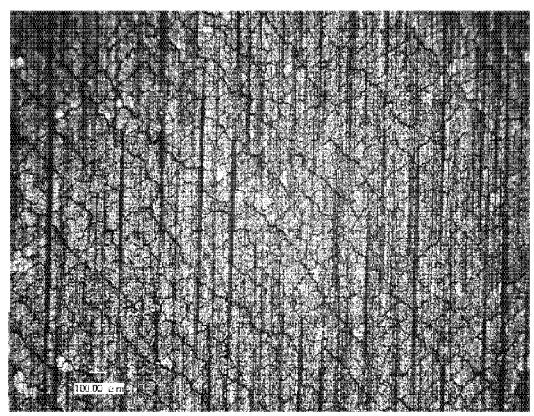
FIG. 3 is a surface photograph of an electrode foil of the present invention in which a crack is formed in an enlarged surface portion.
Figure 4:
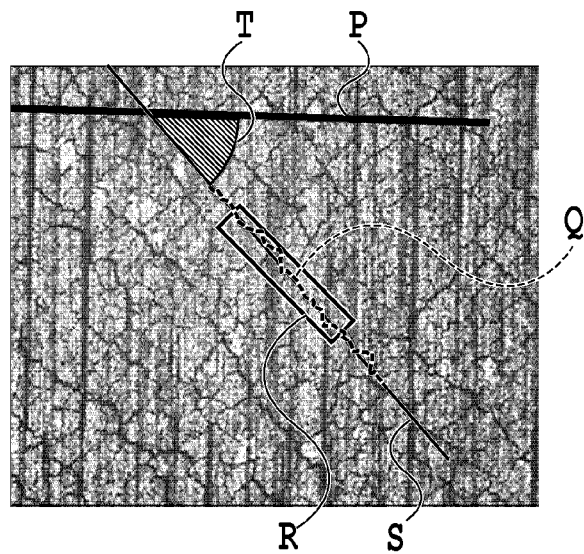
FIG. 4 is an explanatory diagram for explaining measurement of the angle of a crack.

The crack C is formed in the enlarged surface portion 14 in a direction oblique to a width direction orthogonal to a longitudinal direction of the electrode foil 10 (see FIGS. 3 and 4). The longitudinal direction of the electrode foil 10 is, for example, a substantially vertical direction as viewed on the drawing of FIG. 4. The width direction orthogonal to the longitudinal direction of the electrode foil 10 is, for example, a substantially right and left direction as viewed in the drawing of FIG. 4. Longitudinal streaks on the electrode foil 10 in FIG. 4 are substantially parallel to the longitudinal direction of the electrode foil 10. In this case, the longitudinal direction may be the direction of the longitudinal streaks formed in the electrode foil. That is, the width direction orthogonal to the longitudinal direction may be a direction orthogonal to the direction of the longitudinal streaks formed in the electrode foil.

The crack C can be formed by applying a pressing force to the enlarged surface portion 14, by making a cleft, or by making a fissure. Preferably, the crack C is formed by applying a pressing force to the enlarged surface portion 14.

Incidentally, the present invention includes a crack C formed by applying a tensile force to the enlarged surface portion 14 to make a cleft. Further, the present invention includes a crack C formed by applying a temperature change or a humidity change to the enlarged surface portion 14 to make a fissure. The crack C may be formed by a combination of the above formation methods.

The crack C is clearly distinguished from a groove formed by processing such as laser or excavation (hereinafter, simply referred to as a groove). The crack C may be distinguished from the groove by visually observing an image observed with a microscope. Alternatively, the crack C may be distinguished from the groove by a difference between the methods of forming the crack C and the groove. Alternatively, the crack C may be distinguished from the groove by a difference in capacitance between the crack C and the groove. For example, since part of the enlarged surface portion is scraped off from the electrode foil due to the laser processing, a groove formed by laser processing must result in a decrease in capacitance per projected area or unit volume. Therefore, the crack C is clearly distinguished from the groove also in terms of the capacitance per projected unit area or unit volume.

Generally, when a metal is rolled to produce a rolled foil, the surface of the metal foil takes a shape transferred from the shape of rolling roll that touches the foil during rolling. The surface of the rolling roll often has a streak in a vertical direction with respect to a roll width direction. As the streak is transferred to the surface of the foil, a longitudinal streak is observed on the surface of the foil. In this case, on the surface of the metal foil as a raw material, a streak substantially parallel to the longitudinal direction of the foil is formed. The longitudinal streak is simply a shape transferring the shape of the surface of the rolling roll. In this case, when the shape of the streak is, for example, convex (mountain-shaped) on the rolling roll, the shape of the streak is concave (valley-shaped) on the foil. Therefore, the longitudinal streak formed on the electrode foil can be clearly distinguished from the crack C.

Although the width of the crack C is, for example, more than 0 μm and 10 μm or less, it is not particularly limited thereto. Although the distance between a plurality of cracks C is, for example, 10 μm or more and 1000 m or less, it is not particularly limited thereto. Although the depth of the crack C is not particularly limited as long as it does not divide the core portion 12, it is, for example, 80% or more and 100% or less of the thickness of the enlarged surface portion. The depth of the crack C is preferably a depth at which the crack C divides the enlarged surface portion 14 and reaches the core portion 12. The depths of all cracks C may not have to be the same.

The crack C may be formed in both the enlarged surface portion 14 and the further enlarged surface portion 16 of the electrode foil 10.

The oblique direction has an angle of 12° or more and 80° or less, preferably 25° or more and 80° or less, and more preferably 50° or more and 80° or less with respect to the width direction. In this case, the maximum tensile load can be increased while preventing a significant decrease in capacitance of the electrode foil without changing the thickness of the core portion or the thickness of the enlarged surface portion. Thus, it is possible to reduce the thickness of the core portion while maintaining the strength or to increase the thickness of the enlarged surface portion. In this way, the capacitance per unit volume of the electrode foil can be further increased.

In an embodiment focusing on the element diameter of a wound type capacitor element or the tensile elongation at break of the electrode foil, the oblique direction has an angle of 12° or more and 80° or less, preferably 12° or more and 55° or less, and more preferably, 12° or more and 30° or less with respect to the width direction. In this case, it is possible to suppress bending of the foil at the time of winding the element and wind the element smoothly to sufficiently obtain the effect of improving workability at the time of winding the element. As a result, it is possible to reduce the element diameter (maximum value) of the wound type capacitor element and reduce the size of a wound type capacitor.

A description will be given of an embodiment focusing on both the capacitance per unit volume of the electrode foil and the element diameter of the wound type capacitor element at the same time, that is, an embodiment focusing on the use of the wound type capacitor. In this embodiment, the oblique direction has an angle of 12° or more and 80° or less, preferably 25° or more and 55° or less, and more preferably 40° or more and 55° or less with respect to the width direction. In this case, it is possible to obtain a certain level or more of both the effect of further increasing the capacitance per unit volume and the effect of reducing the size of the wound type capacitor. Therefore, it is possible to increase the capacitance of the wound type capacitor in the same case size.

Unlike the wound type capacitor, it is not necessary to take an element diameter into consideration for a laminated capacitor. Therefore, the oblique direction in the embodiment focusing on the use of the laminated capacitor is the same as in the case of the capacitance per unit volume of the electrode foil. That is, the oblique direction has an angle of 12° or more and 80° or less, preferably 25° or more and 80° or less, and more preferably 50° or more and 80° or less with respect to the width direction.

In each of the above embodiments, the upper or lower limit of a range of a preferred angle can be optionally combined with or optionally replaced with the lower or upper limit of a range of another preferred angle range.

The plurality of cracks C may be formed parallel to each other in only one direction, or may be formed in directions in which the cracks intersect each other. In the present application, the term "parallel" includes a meaning of the oblique directions being geometrically in parallel where the oblique directions of the plurality of cracks C are the same, and further includes a meaning of the plurality of cracks C being substantially parallel when viewed macroscopically so that the cracks are aligned and extend from the upper left to the lower right of the electrode foil 10, for example. Further, in the present application, "intersection" means that at least two cracks C overlap with each other in an X shape or a cross shape.

In a case where the cracks C are formed in only one direction, the desired effect (improving the capacitance density while maintaining the maximum tensile load) can be sufficiently obtained. In a case where the cracks C are formed in directions so as to intersect with each other, the direction of the deformation of the foil can be made more uniform in the case of increasing the foil size, and the foil can be conveyed more advantageously on a production line.

Figure 5:
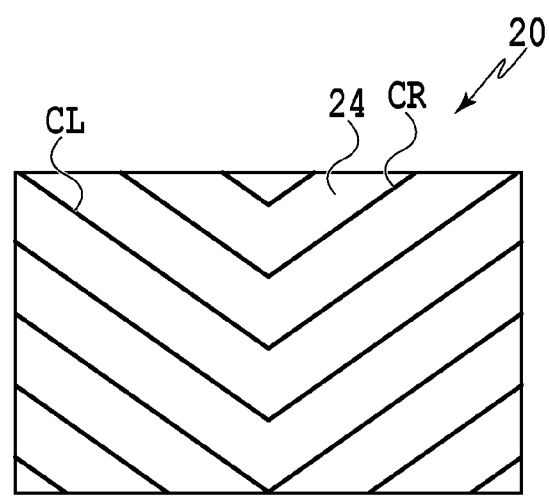
FIG. 5 is a schematic surface view of an electrode foil according to another embodiment of the present invention in which a crack is formed in an enlarged surface portion.

In yet another embodiment, unlike the case of forming the cracks in the directions in which the cracks intersect with each other, both of cracks CL extending from the upper left to the lower right and cracks CR extending from the upper right to the lower left are formed parallel to each other in respective directions in an enlarged surface portion 24 of an electrode foil 20, while no crack is formed intentionally beyond where the cracks CL and CR intersect, that is, the crack may be formed in a V shape (see FIG. 5). In other words, in the enlarged surface portion 24 of the electrode foil 20, a crack in a V shape may be formed when viewed the electrode foil 20 from above, by forming a plurality of cracks CL extending from the upper left to the lower right in parallel to each other and forming a plurality of cracks CR extending from the upper right to the lower left in parallel to each other so that the crack ends where both cracks CL and CR intersect.

In the case of forming the crack in a V shape, a position where both cracks CL and CR intersect in a V shape may or may not be in the middle in the width direction of the electrode foil 20, and preferably is in the middle. When the position where both cracks CL and CR intersect in a V shape is in the middle, it is possible to obtain the effects of the cracks more evenly on the left and right sides in the width direction. Further, when angles of two oblique directions of both cracks CL and CR in a V shape are the same, it is possible to obtain the effects of the cracks more evenly on the left and right sides in the width direction. Therefore, when the crack is formed in a V shape, more preferably, the position where both cracks CL and CR intersect in a V shape is in the middle and the angles of two oblique directions are the same.

In a case where the cracks CL and CR are formed into a V shape, it is possible to shorten the production line as compared with the case of forming in the directions in intersecting with each other. This is because, in the case of forming in the directions in intersecting with each other, it is necessary to form a crack in one by one direction, that is, two steps are required, while in the case of forming into a V shape, only one step is required by devising the shape of the surface of a round bar or the like to be used for forming the cracks CL and CR. In order to form the cracks CL and CR in a V shape, it is possible to use a round bar having a convex shape corresponding to the V shape, for example.

In the case of forming in the directions in intersecting with each other and in the case of forming into a V shape, the cracks are formed in two oblique directions. Here, the angles of the two oblique directions may be the same or different, and are preferably the same. However, in a case where the angles of the two oblique directions are different, at least one of the angles is within the above-described preferred angle ranges in each of the above-described embodiments. Preferably, both of the angles are within the above-described preferred angle ranges.

Figure 6:
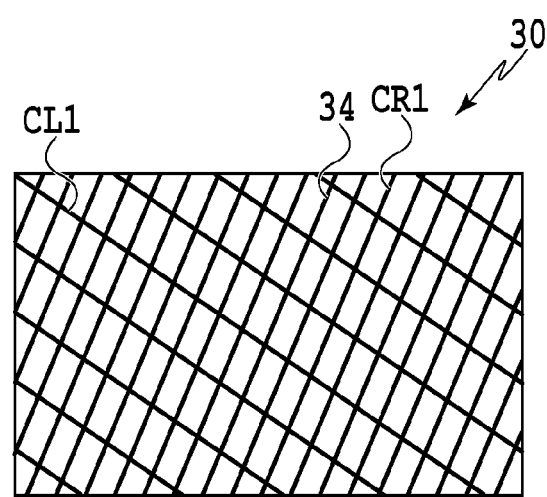
FIG. 6 is a schematic surface view of an electrode foil according to yet another embodiment of the present invention in which a crack is formed in an enlarged surface portion.

FIG. 6 is a schematic surface view of an electrode foil 30 of yet another embodiment of the present invention in which cracks CL1 and CR1 are formed in an enlarged surface portion 34. In FIG. 6, cracks CL1 extending from the upper left to the lower right are formed at about 30° and cracks CR1 extending from the upper right to the lower left are formed at about 65° on the enlarged surface portion 34 of the electrode foil 30 when viewed from above, resulting in the cracks CL1 and CR1 intersecting with each other. In this embodiment, the distance between the cracks CL1 and the distance between the cracks CR1 are different from each other. In order to form the cracks CL1 and the cracks CR1, for example, when pressing round bars at different angles against the electrode foil 30 in which the enlarged surface portion 34 is formed, it is possible to use two round bars having diameters different from each other.

Figure 7:
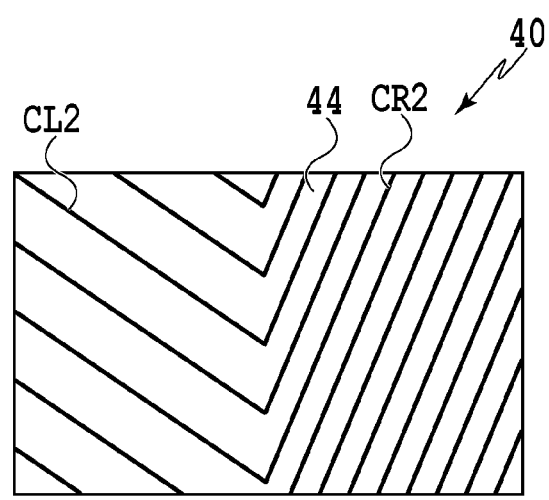
FIG. 7 is a schematic surface view of an electrode foil according to yet another embodiment of the present invention in which a crack is formed in an enlarged surface portion.

FIG. 7 is a schematic surface view of an electrode foil 40 of yet another embodiment of the present invention in which cracks CL2 and CR2 are formed in an enlarged surface portion 44. In FIG. 7, cracks CL2 extending from the upper left to the lower right are formed at about 30° and cracks CR2 extending from the upper right to the lower left are formed at about 65° on the enlarged surface portion 44 of the electrode foil 40 when viewed from above so that the cracks CL2 and CR2 end where the cracks CL2 and the cracks CR2 intersect. In this embodiment, the distance between the cracks CL2 and the distance between the cracks CR2 are different from each other. Specifically, the distance between the cracks CL2 and the distance between the cracks CR2 are different from each other when viewed in a direction perpendicular to the direction of each crack. However, when viewed in a direction from the bottom to the top of FIG. 7, which corresponds to a traveling direction of a production line of the electrode foil 40, the distance between the cracks CL2 and the distance between the cracks CR2 are the same as the distance between the intersections of the cracks CL2 and the cracks CR2. In order to form the cracks CL2 and the cracks CR2, it is possible to use a round bar having a convex shape corresponding to the V shape formed by the CL2 and CR2 in FIG. 7, for example.

<Wound Type Capacitor Element>

A wound type capacitor among capacitors can form a capacitor element by sandwiching a separator between an anode foil and a cathode foil and winding them around a winding core as a winding shaft.

<Wound Type Capacitor>

The wound type capacitor element is impregnated with an electrolyte, a conductive polymer, or both the electrolyte and the conductive polymer and is housed in a bottomed cylindrical outer case, the anode terminal and the cathode terminal are pulled out and sealed with a sealing body, aging treatment is performed, and thus a wound type capacitor can be formed.

<Laminated Capacitor>

A laminated capacitor among capacitors comprises an anode converted foil, a solid electrolyte, and a cathode body. As the solid electrolyte, it is possible to use a solid electrolyte containing a conductive polymer such as polypyrrole, polythiophene, polyfuran, or polyaniline. As the cathode body, it is possible to use a laminate of a carbon layer and a silver paste layer or the like.

In the following, the characteristics of the electrode foil according to the present invention will be described by using comparative examples and embodiments about verified experiments. First, a method for evaluating each characteristic of the electrode foil will be described. It should be noted that the experiments and evaluation method are examples for describing the present invention, and not for limiting the present invention.

<Evaluation Method>

(1) Capacitance

On the basis of the Japan Electronics and Information Technology Industries Association (JEITA) standard EIAJ RC-2364A, capacitance is measured in an aqueous solution of ammonium adipate.

(2) Tensile Strength

On the basis of the Japan Electronics and Information Technology Industries Association (JEITA) standard EIAJ RC-2364A, after slitting the electrode foil to a width of 10 mm, a tensile test is performed to measure a maximum tensile load and tensile elongation at break.

(3) Photomicrograph

The surface of an unconverted foil is observed. A converted foil is used as an anode foil to observe the cross section of a capacitor element in which the converted foil and a conventionally used cathode foil are wound through a conventionally used separator.

(4) Crack Angle
1. In the present embodiment, as is well shown in FIG. 4, a crack angle T is defined as the absolute value of a sharp angle among angles between a straight line S for angle measurement along a crack Q in a constant direction continuously of 0.5 mm or more and a straight line P (hereinafter referred to as a "reference line") parallel to a width direction when a direction orthogonal to the direction of vertical streaks formed in the electrode foil is the width direction.
2. The continuous crack Q is a crack that is continuously within the range R of a frame of width 100 μm×length 500 μm without lying off the range R in a surface photograph of the electrode foil taken with a microscope at a magnification of 100 times.
3. The straight line S for angle measurement is a straight line connecting two points where short sides of the above frame and the continuous crack Q arbitrarily selected intersect.
4. The crack angle T shown in the present embodiment is the average of crack angles measured for each of three arbitrarily selected continuous cracks.
5. The crack angle T in the present embodiment corresponds to the angle that the oblique direction has with respect to the width direction in the present specification.

(5) Capacitor Element Diameter

Figure 8:
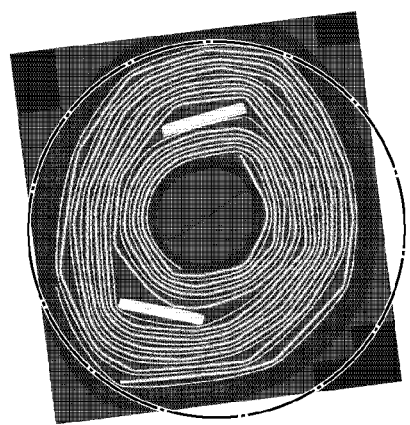
FIG. 8 is a cross-sectional photograph of a capacitor element in which a chemical conversion foil (Comparative Example 1) in which no crack is formed in an enlarged surface portion is used as an anode foil.
Figure 9:
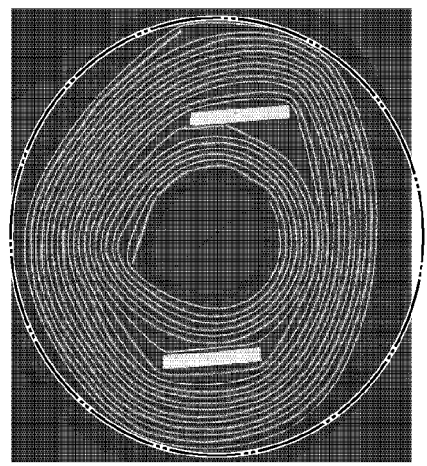
FIG. 9 is a cross-sectional photograph of a capacitor element in which a chemical conversion foil (Example 2) in which a crack is formed in an enlarged surface portion is used as an anode foil.
Figure 10:
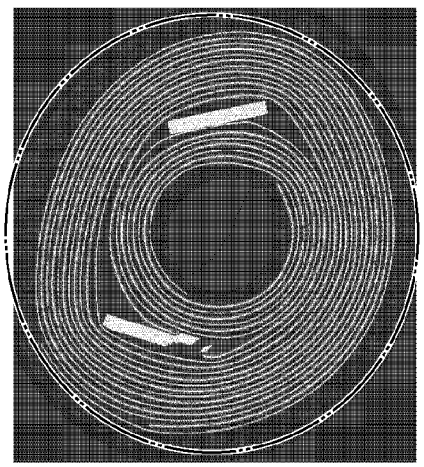
FIG. 10 is a cross-sectional photograph of a capacitor element in which a chemical conversion foil (Example 5) in which a crack is formed in an enlarged surface portion is used as an anode foil.
Figure 11:
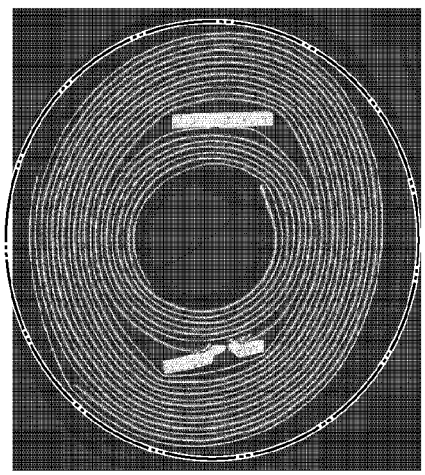
FIG. 11 is a cross-sectional photograph of a capacitor element in which a chemical conversion foil (Example 8) in which a crack is formed in an enlarged surface portion is used as an anode foil.

The maximum value of an element diameter is measured on a cross-sectional photograph of the capacitor element taken with a microscope. Specifically, the diameter of the smallest circle (a circle in a photograph; for example, the one-dot chain line circle in FIG. 8 and the two-dot chain line circle in FIGS. 9 to 11) of circles that circumscribe the element is measured.

<Experiment 1>: Confirmation of the Effect of Oblique-Cracking in an Anode Converted Foil (the Comparison of the Strengths of Converted Foils with and without Oblique Cracks, and the Confirmation of Preferable Ranges of Crack Angles when the Strengths are the Same)

In present experiment 1, each of the above characteristics is verified using 10 types of anode converted foils of Examples 1 to 8, Comparative Example 1, and Comparative Example 2. Here, the maximum tensile loads in Examples 2 to 8 are adjusted to be about the same as that in Comparative Example 2. Specifically, the thicknesses of the enlarged surface portions are adjusted in Examples 2 to 7, and a foil thickness is adjusted for Example 8.

Example 1

By using an aluminum raw foil having a thickness of 115 μm, AC etching for low-pressure foils was performed on both the front and back surfaces of the foil so that the thicknesses of the enlarged surface portions formed on each surface were almost the same to form enlarged surface portions with a total thickness of 70 μm. Specifically, by using an etching solution containing 4.5 wt % of hydrochloric acid having a liquid temperature of 35° C., 0.9 wt % of sulfuric acid, and 2.0 wt % of aluminum chloride, etching was performed at a current density of 280 mA/cm$^2$ and using a triangular wave (half wave) as a current waveform. Time for etching was varied depending on the thickness of the enlarged surface portion. The etched foil was subjected to post-treatment for low pressure foils. Specifically, the foil was immersed in a post-treatment liquid containing 10 wt % of nitric acid having a liquid temperature of 60° C. for 2 minutes. After that, a round bar having a diameter of 3 mm was pressed in a direction of forming an angle of 45° obliquely to the right with respect to the width direction of the foil. Next, the same round bar was pressed in a direction of forming an angle of 45° obliquely to the left to make cracks in the oblique direction so as to intersect each other. Then, a conversion solution containing 1.4 wt % ammonium dihydrogen phosphate at a liquid temperature of 85° C. was used, and chemical conversion treatment was performed at a current density of 50 mA/cm$^2$ and a chemical conversion voltage of 160 V until 10 minutes elapsed after reaching 160 V to prepare an anode converted foil.

Example 2

An anode converted foil in Example 2 was prepared in the same manner as in Example 1 except that enlarged surface portions having a total thickness of 97 μm were formed to make cracks at an angle of 80° obliquely to the right and an angle of 80° obliquely to the left.

Example 3

An anode converted foil in Example 3 was prepared in the same manner as in Example 1 except that enlarged surface portions having a total thickness of 93 μm were formed to make cracks at an angle of 65° obliquely to the right and an angle of 65° obliquely to the left.

Example 4

An anode converted foil in Example 4 was prepared in the same manner as in Example 1 except that enlarged surface portions having a total thickness of 90 μm were formed to make cracks at an angle of 53° obliquely to the right and 53° obliquely to the left.

Example 5

An anode converted foil in Example 5 was prepared in the same manner as in Example 1 except that enlarged surface portions having a total thickness of 88 μm were formed to make cracks at an angle of 45° obliquely to the right and an angle of 45° obliquely to the left.

Example 6

An anode converted foil in Example 6 was prepared in the same manner as in Example 1 except that enlarged surface portions having a total thickness of 82 μm were formed to make cracks at an angle of 26° obliquely to the right and an angle of 26° obliquely to the left.

Example 7

An anode converted foil in Example 7 was prepared in the same manner as in Embodiment 1 except that enlarged surface portions having a total thickness of 77 μm were formed to make cracks at an angle of 12° obliquely to the right and an angle of 12° obliquely to the left.

Example 8

An anode converted foil in Example 8 was prepared in the same manner as in Example 1 except that an aluminum raw foil having a thickness of 100 μm was used.

Comparative Example 1

An anode converted foil in Comparative Example 1 was prepared in the same manner as in Example 1 except that no crack was made after post-treatment.

Comparative Example 2

An anode converted foil in Comparative Example 2 was prepared in the same manner as in Example 1 except that after post-treatment, a round bar was pressed in the width direction of the foil to make cracks.

Capacitances, maximum tensile loads, and tensile elongations at break were measured for the electrode foil in Examples 1 to 8, Comparative Example 1, and Comparative Example 2. Further, by using the electrode foil for an anode foil, an electrolytic capacitor was wound as an element to measure the element diameter thereof.

Figure 12:
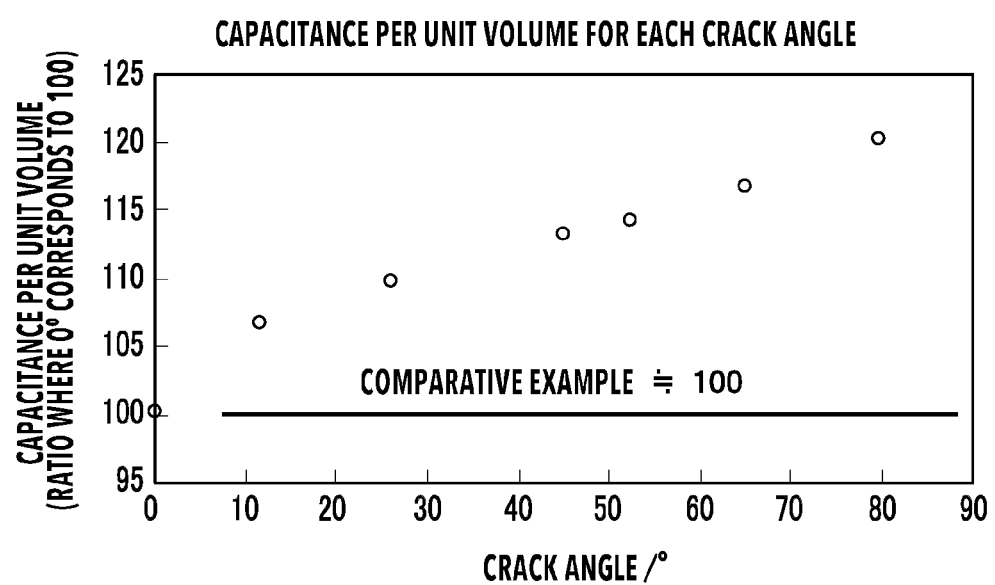
FIG. 12 is a graph showing the capacitance per unit volume of an electrode foil for each crack angle (Examples 2 to 7 and Comparative Example 2) in Experiment 1.
Figure 13:
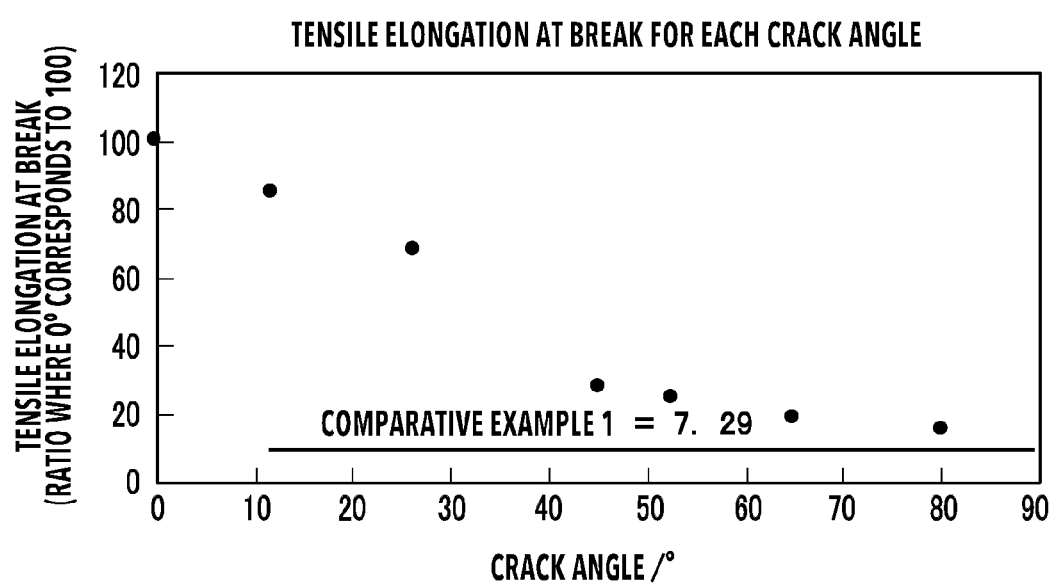
FIG. 13 is a graph showing tensile elongation at break for each crack angle (Examples 2 to 7 and Comparative Example 2) in Experiment 1.
Figure 14:
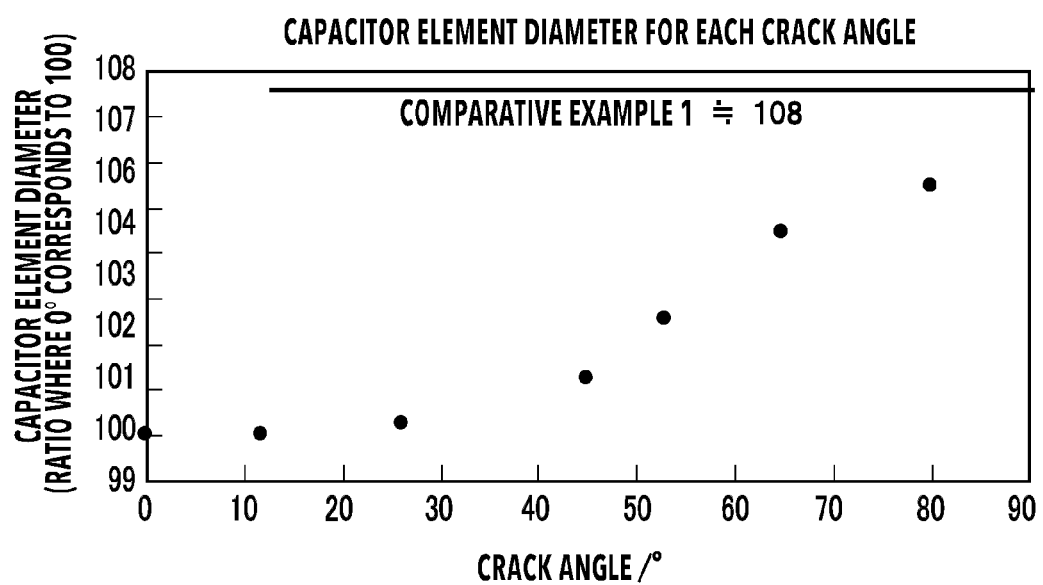
FIG. 14 is a graph showing a capacitor element diameter (maximum value) for each crack angle (Examples 2 to 7 and Comparative Example 2) in Experiment 1.

Table 1 shows foil thickness, core thickness, crack angle, capacitance, maximum tensile load, tensile elongation at break, maximum element diameter, and the effect of suppressing bending of the foil at the time of winding the element in Examples 1 to 8, Comparative Example 1 and Comparative Example 2. Further, as to effect of crack angle when the maximum tensile loads are set to the same level, FIG. 12 shows capacitance per unit volume of electrode foil, FIG. 13 shows tensile elongation at break of electrode foil, and FIG. 14 shows capacitor element diameter. Here, the width direction or the lateral direction of the foil means a crack angle of 0°.

As shown in Table 1, the anode converted foil in Example 1 provided a sufficiently large maximum tensile load with the same foil thickness as in Comparative Example 2. The anode converted foils in Examples 2 to 8 provided higher capacitances with the same maximum tensile load as in Comparative Example 2. The anode converted foil in Example 8 provided almost the same capacitance with a smaller foil thickness than that in Comparative Example 1 and Comparative Example 2. In other words, Examples 2 to 8 provided anode converted foils with higher capacitance densities than those in Comparative Examples 1 and 2.

Each of the foils of the embodiments provided the tensile elongation at break larger than that in Comparative Example 1. It could be confirmed that the maximum values of the capacitor element diameters were sufficiently smaller than that in Comparative Example 1.

From the above results, it was found that, by forming a crack obliquely in an anode converted foil after an enlarged surface portion was formed and before a dielectric film was formed, it is possible to increase tensile elongation at break as compared with one without any crack and increase a maximum tensile load as compared with one with lateral cracks (crack angle of 0°). In addition, it was found that, by forming cracks so that the crack angle was 12° or more and 80° or less, preferably 12° or more and 65° or less, it is possible to obtain an anode converted foil with high capacitance per unit volume while increasing the tensile elongation at break as compared with the one without any cracks and maintaining the same maximum tensile load as that of the one with lateral cracks.

Further, in view of FIG. 12 that relates to Examples 2 to 7 and Comparative Example 2 in which the thicknesses of the enlarged surface portions were adjusted so as to have almost the same maximum tensile load, it was found that the larger the crack angles were, the higher the capacitances per

TABLE 1

| | Sample | | 160 Vfe Chemical Conversion | | | | Capacitor | |
|---|---|---|---|---|---|---|---|---|
| | Foil Thickness/ Core Thickness (μm) | Crack | Capacitance | Capacitance Density | Maximum Tensile Load | Tensile Elongation at Break | Maximum Element Diameter | Effect of Suppressing Bending |
| Example 1 | 115/45 | Obliquely 45°, intersecting | 99.8 | 99.8 | 126 | 54.2 | 100 | Excellent |
| Example 2 | 115/18 | Obliquely 80°, intersecting | 120 | 120 | 102 | 17.2 | 105 | Good |
| Example 3 | 115/22 | Obliquely 65°, intersecting | 117 | 117 | 102 | 20.9 | 103 | Excellent |
| Example 4 | 115/25 | Obliquely 53°, intersecting | 114 | 114 | 102 | 27.7 | 102 | Excellent |
| Example 5 | 115/27 | Obliquely 45°, intersecting | 113 | 113 | 101 | 31.7 | 101 | Excellent |
| Example 6 | 115/33 | Obliquely 26°, intersecting | 110 | 110 | 99 | 77.2 | 100 | Excellent |
| Example 7 | 115/38 | Obliquely 12°, intersecting | 107 | 107 | 100 | 96.5 | 100 | Excellent |
| Example 8 | 100/30 | Obliquely 45°, intersecting | 100 | 113 | 103 | 35.1 | 100 | Excellent |
| Comparative Example 1 | 115/45 | None | 98.7 | 98.7 | 175 | 7.29 | 108 | None |
| Comparative Example 2 | 115/45 | Lateral | 100 | 100 | 100 | 100 | 100 | Excellent |

*Each of capacitance, maximum load, elongation at break, and maximum element diameter is expressed on the basis of the value in Comparative Example 2 being set at 100.
*Capacitance density is capacitance per foil thickness.

unit volumes of the electrode foils were. Therefore, in order to increase the capacitance per unit volume of the electrode foil, the crack angle is 12° or more and 80° or less, preferably 25° or more and 80° or less, and more preferably 50° or more and 80° or less.

Similarly, it was found from FIG. 13 that the tensile elongation at break of the electrode foil can be suppressed from decreasing as the crack angle becomes smaller. Similarly, it was found from FIG. 14 that an increase in the capacitor element diameter (maximum value) can be suppressed as the crack angle becomes smaller. In other words, it was found that the tensile elongation at break affects the capacitor element diameter (maximum value). Therefore, in order to suppress an increase in the size of the wound type capacitor, the crack angle is 12° or more and 80° or less, preferably 12° or more and 55° or less, and more preferably 12° or more and 30° or less.

Further, it was found from FIGS. 12 and 14 that there is a trade-off relationship between the capacitance per unit volume of the electrode foil and the element diameter of the wound type capacitor element. Therefore, by setting the crack angle to 12° or more and 80° or less, preferably 25° or more and 55° or less, and more preferably 40° or more and 55° or less, it is possible to obtain a certain level or more of both the effect of further increasing the capacitance per unit volume and the effect of reducing the size of the wound type capacitor. In other words, it is possible to increase the capacitance of the wound type capacitor in the same case size.

Although the above consideration was given using an anode converted electrode foil as a representative of converted electrode foils, the same effect can be obtained by using a cathode chemical conversion foil.

In the present experiment and the following experiments, although cracks were formed so as to intersect each other in oblique directions, almost the same effect can be obtained also in a mode in which the oblique directions do not intersect and in a mode in which cracks are formed into a V shape.

The maximum tensile load of the electrode foil according to the present invention is reduced as compared with that of a foil in which no cracks are formed. Due to this, a foil without any crack appears to provide a better effect in a case where the maximum tensile load is placed as a main focus. However, since the maximum tensile load of the foil without any crack actually represents the load of both of the enlarged surface portion and the residual core, it cannot be generally said that a larger maximum tensile load is preferable in handling up to the formation of a capacitor. For example, a comparison in terms of tensile elongation at break shows that even a foil in which cracks are formed at an angle of 80° has larger tensile elongation at break than that of a foil in which no cracks are formed, and the element diameter can also be reduced by about 3%.

On the other hand, when comparing between the method of the present invention and one in which cracks are formed in the lateral direction in the enlarged surface portion, the maximum tensile load is larger in the method of the present invention. When comparing the tensile elongation at break, although it is smaller than in the case of the present invention in which lateral cracks were formed, it is possible to sufficiently obtain the effect of suppressing the occurrence of bending in some places when the foil is wound to form an element. As described above, regardless of the direction of the cracks, although the electrode foil in which cracks are formed has a smaller maximum tensile load than the electrode foil in which no cracks are formed, the same or better workability can be obtained. Specifically, it is difficult to break at the time of slitting, and it is possible to reduce the element diameter without the occurrence of bending in some places during winding. Further, specifically in a case where cracks are formed in the oblique direction, it is possible to increase the maximum tensile load with the same residual core thickness as compared with the electrode foil in which cracks are formed in the lateral direction. Therefore, it is possible to design the residual core to be thinner while maintaining the strength, and increase the capacitance per unit volume.

<Experiment 2>: Confirmation of the Effect of Oblique Cracking in a Cathode Unconverted Foil (Comparison of Effects when the Foil Thicknesses of the Unconverted Foils are the Same)

In present Experiment 2, respective properties were verified using four types of cathode unconverted foils in Example 9, Example 10, Comparative Example 3, and Comparative Example 4.

Example 9

By using an aluminum raw foil having a thickness of 50 μm, AC etching for cathode foils was performed on both the front and back surfaces of the foil so that the thickness of an enlarged surface portion formed on each surface was almost the same to form the enlarged surface portion with a total thickness of 30 μm. Specifically, by using an etching solution containing 4.5 wt % of hydrochloric acid having a liquid temperature of 45° C., 0.9 wt % of sulfuric acid, and 2.0 wt % of aluminum chloride, etching was performed at a current density of 500 mA/cm² using a triangular wave (half wave) as a current waveform. The etching treatment time was appropriately controlled depending on the target thickness of the enlarged surface portion. The etched foil was subjected to post-treatment for cathode foils. Specifically, it was immersed in a post-treatment liquid containing 10 wt % of nitric acid having a liquid temperature of 60° C. for 1 minute. After that, a round bar having a diameter of 3 mm was pressed in a direction forming an angle of 45° obliquely to the right with respect to the width direction of the foil. Next, the same round bar was pressed in a direction forming an angle of 45° obliquely to the left to make cracks in an oblique direction so as to intersect each other to prepare a cathode unconverted foil.

Example 10

A cathode unconverted foil in Example 10 was prepared in the same manner as in Example 9 except that the total thickness of the enlarged surface portion was 35 μm.

Comparative Example 3

A cathode unconverted foil in Comparative Example 3 was prepared in the same manner as in Example 9 in that the total thickness of the enlarged surface portion was 30 μm except that no cracks were made after post-treatment.

Comparative Example 4

A cathode unconverted foil in Comparative Example 4 was prepared in the same manner as in Example 9 except that after the post-treatment, the round bar was pressed in the width direction of the foil to make cracks.

Table 2 shows foil thickness, core thickness, crack angle, capacitance, maximum tensile load, and tensile elongation at break in Example 9, Example 10, Comparative Example 3, and Comparative Example 4.

TABLE 2

| | Sample | | | Unconverted | | |
|---|---|---|---|---|---|---|
| | Foil Thickness (μm) | Core Thickness (μm) | Crack | Capacitance | Maximum Tensile Load | Tensile Elongation at Break |
| Example 9 | 50 | 20 | Obliquely 45°, intersecting | 99.5 | 117 | 92.1 |
| Example 10 | 50 | 15 | Obliquely 45°, intersecting | 105 | 108 | 73.2 |
| Comparative Example 3 | 50 | 20 | None | 101 | 123 | 35.3 |
| Comparative Example 4 | 50 | 20 | Lateral | 100 | 100 | 100 |

*Each of the capacitance, maximum load, and elongation at break is expressed on the basis of the value in Comparative Example 4 being set at 100.

As shown in Table 2, in the cathode unconverted foil of Example 9, larger tensile elongation at break was obtained than that in Comparative Example 3 with the same foil thickness and about the same capacitance as those in Comparative Example 3 and Comparative Example 4. In addition, larger maximum tensile load was obtained than that in Comparative Example 4. In the cathode unconverted foil in Example 10, higher capacitance was obtained with the same foil thickness than that in Comparative Example 3 and Comparative Example 4. The maximum tensile load was about the same as that in Comparative Example 4, and the tensile elongation at break was larger than that in Comparative Example 3.

From the above result, it was found that by forming cracks intersecting in an oblique 45° direction even in the electrode foil in which no chemical conversion film is formed, it is possible to obtain an electrode foil having high capacitance per unit volume while ensuring mechanical strength. Although the above consideration is given by using the cathode unconverted foil as a representative of unconverted electrode foils, the same effect can be obtained by using an anode unconverted foil.

According to the present invention, by making cracks in the enlarged surface portion in a direction oblique to the width direction, it is possible to provide an electrode foil having high capacitance per unit volume while suppressing a decrease in a maximum tensile load due to the formation of the cracks. In the case of making these cracks, by making the cracks in the direction oblique to the width direction, it is possible to become the maximum tensile load sufficiently higher than that of one in which cracks are made along the width direction. Therefore, it is possible to reduce the thickness of the core portion, or increase the thickness of the enlarged surface portion, and further increase the capacitance per unit volume. For example, when applying tension and performing slitting at high speed, the maximum tensile load is said to be strongly related to a slitting property. Therefore, by making cracks in the direction oblique to the width direction, it is possible to make the capacitance per unit volume higher than in the case when the cracks are made in the width direction, while suppressing the possibility of breakage in the electrode foil to the same extent as in the case when cracks are made in the width direction.

In general, by making cracks in the enlarged surface portion, the number of portions where the core portion can be deformed increases, and the tensile elongation at break is improved. Therefore, when the capacitor element is wound in the direction perpendicular to the width direction (the direction of a long side of the foil), the occurrence of bending in some places is suppressed. Accordingly, it is possible to reduce the element diameter (maximum value) of the wound type capacitor, and reduce the size of the wound type capacitor. Since the effect of the present invention is applied to wound type capacitors, it is useful as an electrode foil for wound type capacitors.

It is also known that an electrode foil becomes hard and brittle by performing chemical conversion treatment to form a dielectric film. However, the effect of the present invention can be obtained not only in a case where a crack is made in the enlarged surface portion and then the chemical conversion treatment is not performed, but also in a case where the chemical conversion treatment is further performed to form the dielectric film in the enlarged surface portion including the region of the crack.

According to the present invention, it is possible to provide an electrode foil having high capacitance per unit volume or an electrolytic capacitor using the electrode foil while ensuring mechanical strength.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electrode foil for an electrolyte capacitor,
   the electrode foil comprising an enlarged surface portion on a surface of the electrode foil,
   wherein the electrode foil extends in a longitudinal direction and has a width direction orthogonal to the longitudinal direction,
   wherein a crack is formed in the enlarged surface portion in an oblique direction with respect to the width direction, and
   wherein the oblique direction has an angle of 12° or more and 80° or less with respect to the width direction.
2. The electrode foil according to claim 1, wherein the oblique direction has an angle of 25° or more and 80° or less with respect to the width direction.

3. The electrode foil according to claim 1, wherein the oblique direction has an angle of 12° or more and 55° or less with respect to the width direction.

4. The electrode foil according to claim 1, wherein the oblique direction has an angle of 25° or more and 55° or less with respect to the width direction.

5. The electrode foil according to claim 1, wherein the crack comprises a plurality of cracks intersecting each other.

6. The electrode foil according to claim 1, wherein a dielectric film is further formed in the enlarged surface portion comprising a region of the crack.

7. An electrolytic capacitor, wherein the electrode foil according to claim 1 is used as a cathode foil or an anode foil.

8. An electrode foil for an electrolytic capacitor,
the electrode foil comprising an enlarged surface portion on a surface of the electrode foil,
wherein the electrode foil extends in a longitudinal direction and has a width direction orthogonal to the longitudinal direction,
wherein a crack is formed in the enlarged surface a oblique direction with respect to direction,
wherein, in the enlarged surface portion, the crack comprises a plurality of cracks formed parallel to each other in a first oblique direction with respect to the width direction and wherein another plurality of cracks are formed parallel to each other in a second oblique direction respect to the width direction and different from the first oblique direction,
wherein, when viewed the electrode foil from above, the plurality of cracks in the first oblique direction and the other plurality of cracks in the second oblique direction end where they intersect, and
wherein the plurality of cracks in the first oblique direction and the other plurality of cracks in the second oblique direction are formed in a V shape.

9. An electrode foil for an electrolytic capacitor,
the electrode foil comprising an enlarged portion on a surface of the electrode foil,
wherein the electrode foil extends in a longitudinal direction and has a width direction orthogonal to the longitudinal direction,
wherein a crack is formed in the enlarged surface portion in an oblique direction with respect to the width direction,
wherein, in the enlarged surface portion, the crack comprises a plurality of cracks formed parallel to each other in a first oblique direction with respect to the width direction and wherein another plurality of cracks are formed parallel to each other in a second oblique direction with respect to the width direction and different from the first oblique direction, and
wherein an angle of the plurality of the cracks formed in the first oblique direction and an angle of the other plurality of the cracks formed in the second oblique direction are different from each other.

10. An electrode foil for an electrolytic capacitor,
the electrode foil comprising an enlarged surface portion on a surface of the electrode foil,
wherein the electrode foil extends in a longitudinal direction and has a width direction orthogonal to the longitudinal direction,
in a crack is formed in the enlarged surface portion in an oblique direction with respect to e width direction,
wherein, in the enlarged surface portion, the crack comprises a plurality of cracks formed parallel to each other in a first oblique direction with respect to the width direction and wherein another plurality of cracks are formed parallel to each other in a second oblique direction with respect to the width direction and different from the first oblique direction, and
wherein a distance between each of the plurality of the cracks formed in the first oblique direction is different from a distance between each of the other plurality of the cracks formed in the second oblique direction when viewed in a direction perpendicular to the direction of each crack.

* * * * *

UNITED STATES PATENT AND TRADEMARK OFFICE
CERTIFICATE OF CORRECTION

Page 1 of 1

PATENT NO. : 12,381,042 B2
APPLICATION NO. : 18/137696
DATED : August 5, 2025
INVENTOR(S) : Hiroshi Kubo It is certified that error appears in the above-identified patent and that said Letters Patent is hereby corrected as shown below:

In the Claims

Column 18, Line 54, Claim 1, delete "electrolyte" and insert -- electrolytic --

Column 19, Line 21, Claim 8, delete "surface a" and insert -- surface portion in an --

Column 19, Line 22, Claim 8, delete "to" and insert -- to the width --

Column 19, Line 28, Claim 8, delete "respect" and insert -- with respect --

Column 19, Line 38, Claim 9, delete "enlarged" and insert -- enlarged surface --

Column 20, Line 24, Claim 10, delete "in" and insert -- wherein --

Column 20, Line 25, Claim 10, delete "e" and insert -- the --

Signed and Sealed this
Eighteenth Day of November, 2025

John A. Squires
*Director of the United States Patent and Trademark Office*